(12) United States Patent
Naragon et al.

(10) Patent No.: US 6,267,082 B1
(45) Date of Patent: Jul. 31, 2001

(54) PORTABLE DOG RAMP

(76) Inventors: Richard L. Naragon; Dianne S. Naragon, both of 1313 Fairfield-Yellow Springs Rd., Fairborn, OH (US) 45324

( * ) Notice: Subject to any disclaimer, the term of this patent is extended or adjusted under 35 U.S.C. 154(b) by 0 days.

(21) Appl. No.: 09/420,229

(22) Filed: Oct. 18, 1999

Related U.S. Application Data

(60) Provisional application No. 60/109,190, filed on Nov. 20, 1998.

(51) Int. Cl.[7] .................................................. A01K 29/00
(52) U.S. Cl. .............................................. 119/849; 14/69.5
(58) Field of Search .............................. 296/53, 57.1, 55, 296/61, 50, 51; 119/843, 847, 848, 849; 14/69.5, 71.1, 71.5, 71.3, 71.7, 72.5

(56) References Cited

U.S. PATENT DOCUMENTS

| | | | |
|---|---|---|---|
| 2,587,265 | * | 2/1952 | Wright . |
| 3,984,891 | * | 10/1976 | Weinmann ............................. 14/69.5 |
| 4,127,201 | * | 11/1978 | Baumann .............................. 14/69.5 |
| 5,325,558 | * | 7/1994 | Babreche .............................. 14/69.5 |
| 5,540,474 | * | 7/1996 | Holland ................................. 296/61 |
| 5,768,733 | * | 6/1998 | Kneebone ............................. 14/69.5 |
| 5,857,724 | * | 1/1999 | Jarman ................................ 296/57.1 |
| 5,944,141 | * | 8/1999 | Kochan et al. ....................... 182/163 |
| 6,119,634 | * | 9/2000 | Myrick ................................. 119/847 |
| 6,139,249 | * | 10/2000 | Luchy ................................... 414/537 |

OTHER PUBLICATIONS

Doctors Foster & Smith Magazine—2 pgs.
PetSTEP Operating Instructions—1 pg.

* cited by examiner

*Primary Examiner*—Thomas Price
(74) *Attorney, Agent, or Firm*—William Weigl

(57) ABSTRACT

A sturdy, portable, relatively light weight ramp is provided for assisting an animal in inclined walking between two different levels. The ramp comprises two relatively narrow alignable ramp sections which are centrally hinged and designed to cause their edges adjacent the hinging to firmly abut and be interlocked. The ramp is transportable in a compact first condition in which it is folded at the hinge with the undersides of the two sections in a parallel, back-to-back folded state. When used to support an animal, it is unfolded and the two hinged sections are aligned and firmly locked in an aligned second animal-supporting condition. The hinge and locking interconnection are relatively closely tolerated so as to provide a stable linearly-extending ramp capable of supporting heavy large as well as light small pets. Carpeting is provided on the walking surface for traction, and a strap may be used to tie the ramp to a vehicle and further stabilize it, thereby overcoming any fear an animal may have in traversing the ramp.

13 Claims, 1 Drawing Sheet

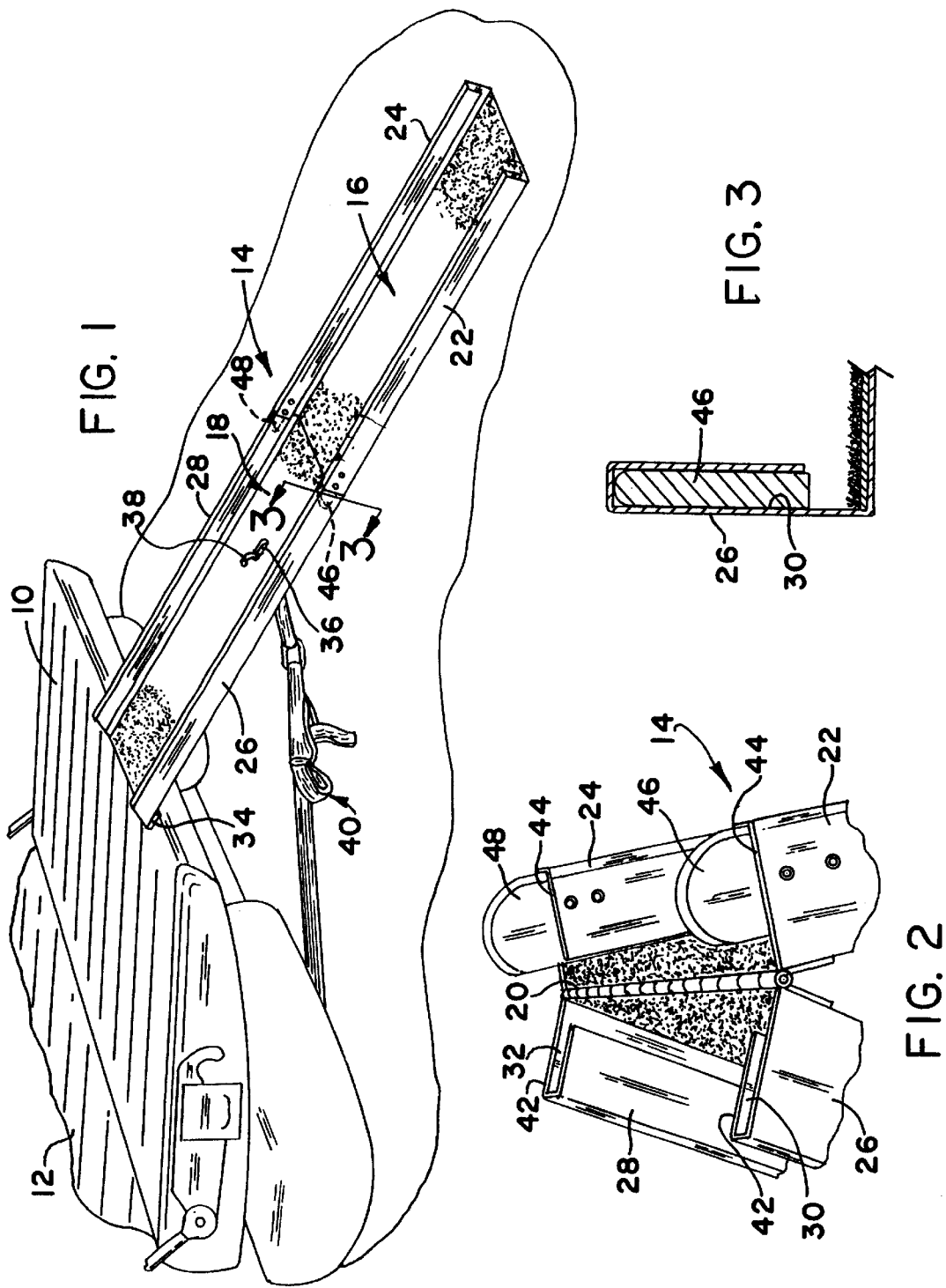

PORTABLE DOG RAMP

This application is based on my U.S. Provisional Patent Application Ser. No. 60/109,190, filed Nov. 20, 1998.

BACKGROUND OF THE INVENTION

This invention relates to a device for enabling a dog or other household pet to move from one level to another along an inclined straight ramp. In particular, it relates to a relatively compact, sturdy, collapsible light-weight portable unit which can be easily carried in an automotive vehicle, expanded and contracted as needed, and used to assist the animal in entering into or exiting from the vehicle.

When using sport utility vehicles (SUV's), pick-up trucks, station wagons, recreational vehicles and various other automotive vehicles which may be high off the ground and hard to get into and out of, ingress and egress of pets relative to the vehicle can become a significant problem. This is particularly true for dogs having hip dysplasia or arthritis, are pregnant or recovering from surgery, or have long backs and should not be jumping downwardly, e.g., basset hounds or dachshunds. It is also important that "show dogs" be protected from possible injury from jumping into or out of a vehicle. A dog access problem also exists with respect to ingress and egress relative to boats, travel crates, grooming tables, beds, etc. Recently, the problem has been resolved in part through availability of one-piece and telescoping ramps. A one piece ramp, on the order of 56" in length has two problems. If the upper level is high off the ground or floor level, it may be quite steep, perhaps 40–45 degrees. Additionally, its 56" length makes it difficult to transport in many vehicles and occupies much space. The known telescoping ramp, while expanding to 70", collapses to 48", still quite long and a bit cumbersome. Its weight of 21 to 24 pounds (depending on the model), makes its size, weight and extending somewhat of a problem for vehicular usage. Its sturdiness is not known.

This problem has been long-solved for large four-legged animals such as horses, cattle, various zoo animals, etc., by providing ramps at the rear of a trailer, for example. Oftentimes, the ramp consists of a tailgate that is hinged at its lower edge and dropped into an inclined position for enabling its being traversed by the animals. For side-loading of railroad cars and wagons, a large ramp or gangway is known to be hoisted into position for the intended loading and unloading purposes.

While these uses of gangways have been well-known for a long time for large animals, it is believed only recently that consideration has been given to a similar problem in connection with pets traveling with their owners, whether for long vacation trips or short trips to a veterinarian or park. There exists a need for a relatively compact, light-weight portable and sturdy dog ramp which can be easily handled by one person when assisting an animal in getting into or out of an automotive vehicle.

SUMMARY OF THE INVENTION

A sturdy, portable, relatively light weight ramp is provided for assisting an animal in inclined walking between two different levels. The ramp comprises two relatively narrow alignable ramp sections which are centrally hinged and designed to cause their edges adjacent the hinging to firmly abut and be interlocked. The ramp is transportable in a compact first condition in which it is folded at the hinge with the undersides of the two sections in a parallel, back-to-back folded state. When used to support an animal, it is unfolded and the two hinged sections are aligned and firmly locked in an aligned second animal-supporting condition. The hinge and locking interconnection are relatively closely toleranced so as to provide a stable linearly-extending ramp capable of supporting heavy large as well as light small pets. Carpeting is provided on the walking surface for traction, and a strap may be used to tie the ramp to a vehicle and further stabilize it, thereby overcoming any fear an animal may have in traversing the ramp.

BRIEF DESCRIPTION OF THE DRAWINGS

FIG. 1 is a pictorial representation of the ramp of our invention mounted for enabling a dog or other animal to enter onto or leave a tailgate of an SUV or truck bed.

FIG. 2 is a fragmentary isometric view of the hinged and interlocking ends of the two sections of the ramp in a condition either just after disconnecting the sections or prior to connecting them together.

FIG. 3 is an enlarged fragmentary cross-sectional view of the locking interconnection in its locked condition, as taken along the lines 3—3 of FIG. 1.

DESCRIPTION OF THE PREFERRED EMBODIMENT

FIG. 1 is a simplified depiction of parts of an automotive vehicle such as an SUV having a tailgate 10 lowered to cause the top surface of the tailgate to coincide with the floor 12 of the vehicle. For ease of simplification, a linearly-extending inclined ramp 14 will be described for enabling a dog to get into or out of the vehicle, with or without the owner's help. The ramp may be inclined as much as 30 degrees relative to the ground. While the ramp is usable for assisting pets other than dogs, it will be described hereinafter primarily in connection with dogs. As an example, assume the pet is a large dog, weighing as much as 150–180 pounds, has an infirmity making it impossible to have the dog jump up into or down out of the vehicle, and difficult for a single individual to lift it.

The ramp 14 comprises a first section 16 and a second section 18 hinged together at 20 by a continuous piano hinge (see FIG. 2) or other suitable hinging mechanism. The continuous nature of such a hinge gives it an added advantage of strengthening the sections laterally. It can be seen from FIGS. 1 and 2 that each section 16, 18 has upstanding side edges 22 and 24 for the first section and side edges 26 and 28 for the second section. Between the side edges, the sections are provided with flat bottom surfaces. As can be seen at the lower end of the ramp 14 in FIG. 1, adjacent the hinge 20 in FIG. 2 and in cross-section in FIG. 3, the preferred form of section is made in a general U-shape, of 16 or 14 gauge sheet aluminum. The side edges 22–26 are formed in the sheet by extending upwardly, then inwardly a short distance, then back downwardly toward the bottom, all at right angles. This strengthens the sections 16 and 18 lengthwise while also providing a pair of female slots 30 and 32 (FIG. 2) to be discussed shortly. The second section 18 of the ramp 14 is provided with a friction pad 34 on its underside to rest on the tailgate 10 or other surface at the upper level. The thickness of the pad 34 keeps the undersides of the sections 16 and 18 from contacting each other when folded together for transporting. The section 18 also has a hole 36 passing therethrough to enable a hook 38 at one end of an adjustable length strap 40 to secure the ramp 14 to the vehicle or whatever other surface the dog is traveling to or from. Some animals are sensitive to an unstable surface even when assisted by their owners on a leash or by the collar.

Stability of the ramp is especially necessary for a dog unfamiliar with the ramp, and so also is the frictional grip or toe traction the dog has with the surface of the ramp on which it is walking. For that reason, we cement a washable thin carpeting to the ramp surfaces. If the dog senses the potential of slipping on the ramp, oftentimes it will refuse to walk, particularly downwardly. The carpet surface provides a toenail grip or traction, assuring the dog that it will not slip.

A critical part of the ramp design is the manner in which it firmly locks in place at the hinge joint. A stable hinge and interlocking mechanism is required. While many such mechanisms may be made to achieve these results, we have found one which functions simply and is of simple design. The two sections 16 and 18, when in the dog-supporting condition shown in FIG. 1, should provide a non-sagging, non-wobbling surface. This is accomplished by abutting the ends 42 and 44 of the side edges 22–28 in firm relationship. The ends 42 and 44, while preferably being at right angles to the bottom surfaces of the ramp sections, may be at some other angle provided the abutments engage firmly. To achieve the alignment of the abutting edges, a locking connection in the form of closely interfitting knife-switch type male portions or blades 46, 48 and the cooperating female portions or slots 30 and 32 are provided. When in engagement, the male and female portions fit snuggly as shown in FIG. 3. The blades are shown as being riveted between the outer and inner sides of their respective side edges 22 and 24. While both blades are shown in one section, one can be in each and face in opposite directions.

Assume that the ramp 14 is being transported in a vehicle in a box or bag to protect the vehicle's upholstery. While so contained, it will be in a folded condition where the underside surfaces of the sections 16 and 18 face each other, being kept apart at their distal ends only by the pad 34. The container is taken from the vehicle, opened, and the ramp 14 is unfolded by rotating the two sections 16 and 18 outwardly about the hinge 20. In the final stages of alignment, the blades or male portions 46 and 48 enter the female slots 30 and 32. The protruding upper and forward ends of the blades are rounded to allow them to smoothly enter the slots, but once entered, their flat sides firmly and snuggly hold against the inside walls of the slots. (See FIG. 3.) Ordinarily, a person may have to press one knee slightly against one of the sections to lock the knife-interconnections together. The tightness of the interconnection often requires that the ramp sections be unfolded by placing a knee against the underside of a section to break the interlocking mechanism apart.

While we have illustrated one type of hinge and one type of locking mechanism, it is obvious that others may be used to accomplish the necessary stability and animal safety required. Also, while we make our sections of structural aluminum sheets, other materials, including plastic sheets, injection molded sections and the like are feasible and be apparent to the skilled artisan. It is important to keep the hinged unit light in weight, easy to handle, stable and of dimensions capable of easy transporting and at a reasonably shallow angle when operative. We have found greatest stability to be achieved by using a sound hinge and firm interlocking mechanism. A preferred extended length of our ramp is 70" to 72", and the preferred weight is less than 12 pounds. When folded, the unit is approximately 36" inches long and 14" wide, suitable for carrying in practically all automotive vehicles. Various other designs within the scope of our claims are possible within these parameters.

Having described our invention, we claim:

1. A portable, relatively light weight straight ramp for assisting a dog in inclined walking between different levels, said ramp comprising:

a. a first channel section having a flat bottom and upturned side edges spaced laterally a distance sufficient to allow a dog to walk between the edges;

b. a second channel section essentially the same length as said first section and having a flat bottom and corresponding side edges;

c. the side edges on at least one end of each section having ends essentially at right angles to the flat bottom of its respective channel section whereby said ends may be brought into abutting relationship and the flat bottoms brought into alignment when so abutting;

d. a hinge interconnecting said first and second channel sections in a manner whereby said ramp can be converted between a first folded condition having the undersides of their bottoms adjacent one another for ease of transporting the ramp and a second linearly-extended dog-supporting condition with the bottoms of said channel sections in alignment; and e. a lockable interconnection located at each side edge of the hinged portion of the channel sections, each of said interconnections comprising a male portion affixed to a side of its respective channel section and movable toward the opposing channel section when aligned, and a female portion at the adjacent abutting end of the side edge of the opposing section for receiving said male portion, each of said male and female portions fitting relatively snuggly when in engagement whereby to maintain said first and second channel sections essentially as a straight, firm, elongated unit when extended from the first folded into the second dog-supporting condition.

2. The ramp according to claim 1 wherein each said lockable interconnection comprises a knife-blade type male blade and female slot.

3. The ramp according to claim 1 wherein said male portions are both connected to one of said sections and the female portions are both connected to the other of said sections.

4. The ramp according to claim 2 wherein said male blades and slots lie in a plane perpendicular to said section bottoms and coincide with the upturned side edges of said sections.

5. The ramp according to claim 4 wherein each of said channel sections is fabricated from a single sheet of metal with the cross-sectional shape of the side edges of each section extending upwardly at right angles from the bottoms, inwardly at right angles, then downwardly at right angles to form the female slots for receiving the blades of the locking interconnection as said channel sections are placed in abutting relationship when the flat bottoms are brought into alignment.

6. The ramp according to claim 5 wherein the male blades are flat and the female slots have side-to-side dimensions which effect a tight fit between the said blades and slots when the unit is placed in the second condition.

7. The ramp according to claim 1 wherein said section bottoms are provided with a padded frictional surface capable of enabling the animal's toenails to grip adequately.

8. The ramp according to claim 7 wherein said surface comprises a washable carpeting.

9. A portable, relatively light weight straight ramp for assisting a dog in inclined walking between different levels, said ramp comprising:

a first ramp section having a flat dog-supporting surface;

a second ramp section essentially the same length as said first ramp section and having a flat dog-supporting surface;

a hinge interconnecting said first and second ramp sections in a manner whereby said ramp sections can be converted between a first inactive folded condition having undersides of their dog-supporting surfaces adjacent one another for ease of transporting the ramp and a second active condition with the dog-supporting surfaces in alignment;

surface portions on each ramp section which surface portions are brought into abutting contact relationship when the ramp sections are placed in their active positions; and at least one laterally-stabilizing and aligning interconnection adjacent the hinge, said interconnection comprising a male portion movable toward the opposing ramp section when said sections are aligned, and a female portion for receiving said male portion, each of said male and female portions fitting relatively snuggly when in engagement whereby to maintain said first and second ramp sections essentially as a straight, firm, elongated unit when located in the second active condition.

10. A ramp according to claim 9 wherein said male and female portions are permanently affixed to their respective ramp sections and movable therewith.

11. A ramp according to claim 9 wherein said abutting surface portions and said male and female portions together comprise both longitudinally and laterally stabilizing and locking elements maintaining said ramp sections in firm alignment when in their active condition.

12. A ramp according to claim 9 wherein each said ramp section is fabricated from a single sheet of metal having side edges extending upwardly at right angles, inwardly at right angles, then downwardly at right angles to form the female portions for receiving the male portions of the interconnection as said ramp sections are placed in abutting relationship in their active condition.

13. A ramp according to claim 9 wherein said ramps are provided with a washable carpeting having a surface enabling an animal's toenails to grip the surface without slipping while traversing an inclined ramp.

* * * * *